No. 616,421. Patented Dec. 20, 1898.
G. W. MANSON.
BICYCLE.
(Application filed Oct. 12, 1897.)
(No Model.) 2 Sheets—Sheet 1.
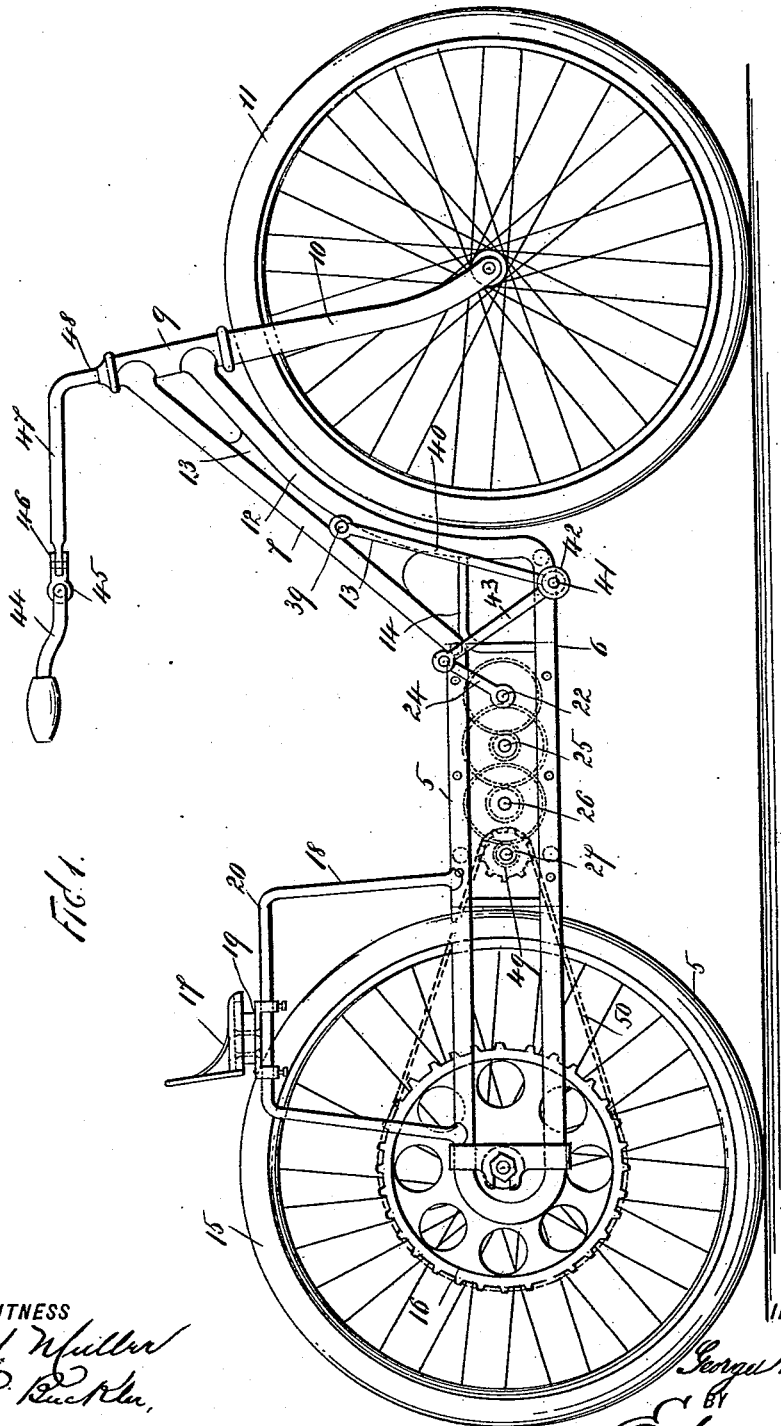
WITNESS
INVENTOR
ATTORNEYS

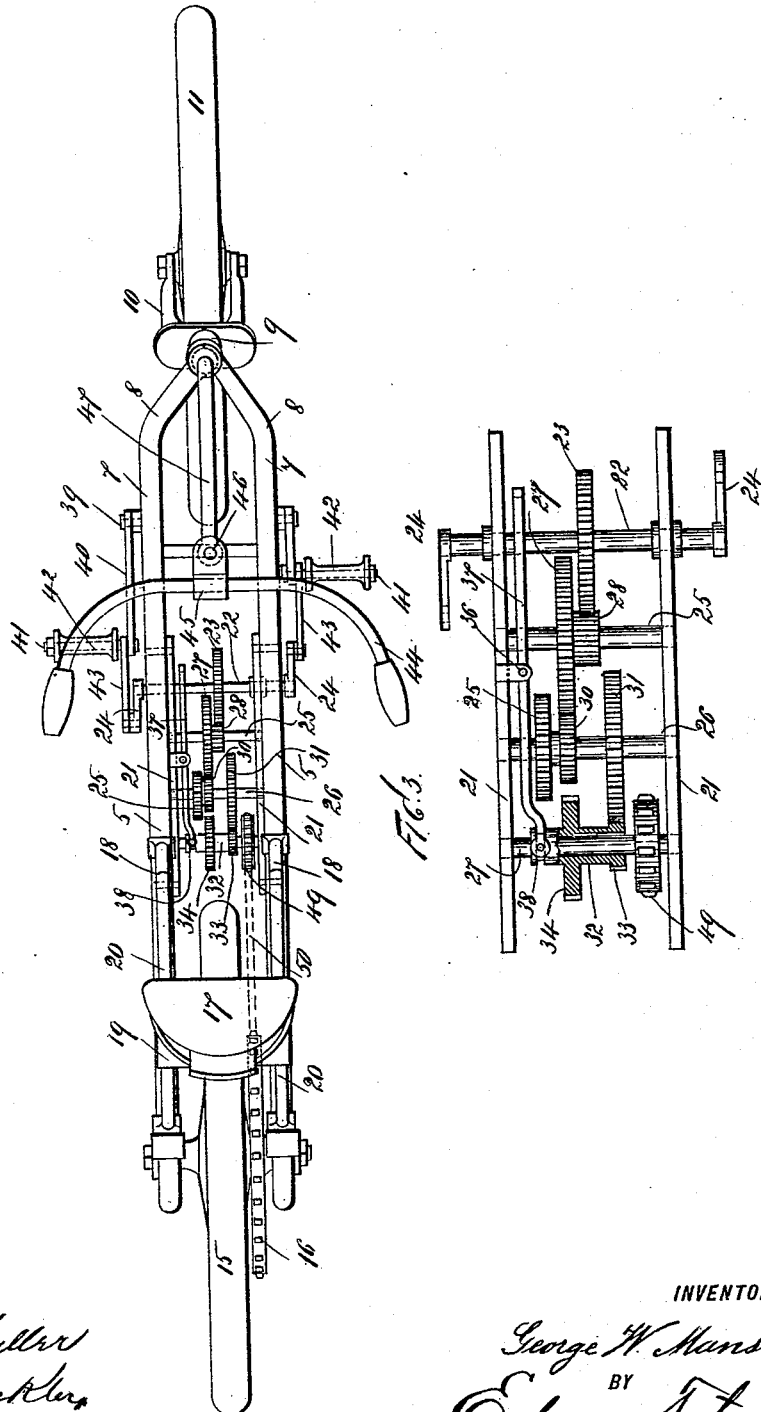

UNITED STATES PATENT OFFICE.

GEORGE W. MANSON, OF NEW YORK, N. Y.

BICYCLE.

SPECIFICATION forming part of Letters Patent No. 616,421, dated December 20, 1898.

Application filed October 12, 1897. Serial No. 654,950. (No model.)

*To all whom it may concern:*

Be it known that I, GEORGE W. MANSON, a citizen of the United States, residing at New York, in the county of New York and State of New York, have invented certain new and useful Improvements in Bicycles, of which the following is a full and complete specification, such as will enable those skilled in the art to which it appertains to make and use the same.

This invention relates to bicycles; and the object thereof is to provide a vehicle of this class with improved propelling mechanism whereby the speed of the vehicle may be largely increased without correspondingly increasing the power employed.

The invention is fully disclosed in the following specification, of which the accompanying drawings form a part, in which—

Figure 1 is a side view of a bicycle constructed according to my invention; Fig. 2, a plan view thereof, and Fig. 3 a plan view of the propelling mechanism on an enlarged scale.

In the drawings forming part of this specification the separate parts of my improvement are designated by the same numerals of reference in each of the views, and in the practice of my invention I provide a frame which consists of two sets of side bars 5 and 6, and the side bars 5 and 6 on each side are placed in a vertical plane, and the forward ends of the side bars 5 on each side are bent upwardly, as shown at 7, and forwardly and curved, as shown at 8, and are connected with the tubular head 9, through which the steering-rod connected with the forward fork 10 passes, and the bottom side bars 6 on each side are also curved upwardly over the guide-wheel 11, as shown at 12, and are also connected with the tubular head 9.

The upwardly-curved portions 7 and 12 of the bars 5 and 6 on each side are connected by a web 13, so as to give strength and rigidity thereto, and placed at the bend of the side bars 5 and 6 at each side is an angular brace 14, by which said bars are connected.

The drive-wheel 15 is mounted in the rear portion of the frame, as shown in Figs. 1 and 2, and placed on the axle thereof is a large sprocket-wheel 16, and I also provide a support for the seat 17, which consists of upwardly-directed yoke-shaped frames 18, which are connected with the top horizontal bar 5 on each side of the drive-wheel, and the seat 17 is connected with a cross-plate 19, which is connected with said yoke-shaped frames 18, as clearly shown in Figs. 1 and 2, and as thus constructed it will be seen that the seat 19 is much lower than in vehicles of this class as usually constructed, and said seat may be longitudinally adjusted on the upper horizontal portions 20 of the yoke-shaped frames 18 and secured in its adjusted position by means of suitable binding-bolts.

The advantage of the construction and arrangement of the seat and its support as above described lies in the fact that the position of the rider may be adjusted with respect to the front fork of the main frame and the handle-bars and also that by merely dropping the feet off the pedals the machine can be maintained in an upright position while not in motion for an indefinite time. The rider is thus enabled to use his hands for other purposes than maintaining the equilibrium or guiding of the wheel. Furthermore, the low position of the seat enables the rider to apply great power to the pedals, which power is directed in practically a horizontal plane.

I also preferably provide a supplemental frame, which consists of two horizontal plates 21, which are secured to the inner sides of the bars 5 and 6 of the main frame on each side and between the guide-wheel 11 and the drive-wheel 15, and passing centrally through the forward ends of these plates is a crank-shaft 22, which is provided with a gear-wheel 23, and at the outer ends thereof, which project beyond the sides of the main frame, said shaft is provided with cranks 24. The supplemental frame or the plates 21 are also provided with three other transverse shafts 25, 26, and 27, arranged in the order named, the shaft 25 being adjacent to the crank-shaft 22, and said shaft 25 is provided with a pinion 28, which operates in connection with the gear-wheel 23 on the crank-shaft, and said shaft 25 is also provided with a gear-wheel 29, which operates in connection with a pinion 30 on the shaft 26, and the shaft 26 is provided with a gear-wheel 31, and mounted on the shaft 27 is a sleeve 32, which is longitudinally movable thereon, but which revolves with said shaft, and said sleeve is provided at one end with a pinion 33, which is adapted to operate in connection with the gear-wheel 31 on the shaft 26 and also with a gear-wheel 34, and the shaft 26 is also provided with an independent gear-wheel 35, and connected at one side of the supplemental frame at 36 is a lever 37, one end of which is connected with the end of the sleeve 32, as shown at 38, and by means of the lever 37 the sleeve 32 may be moved longitudinally of the shaft 27 in such manner that the gear-wheel 34 thereon will engage with the gear-wheel 35 on the shaft 26, and in this operation the pinion 33 on the sleeve 32 will be thrown out of engagement with the gear 31.

Pivotally connected with the main frame at a predetermined point above the horizontal portion thereof, as shown at 39, and on each side thereof are rods 40, which are suspended from their pivotal supports, as shown in Fig. 1, and the lower ends thereof are connected with pedal-shafts 41, on which are mounted pedals 42, and connected with the pedal-shafts 41 are crank-rods 43, which are also connected with the ends of the cranks 24.

The handle-bar 44 is of the usual form and passes through or is connected with a coupling-head 45, which is pivotally connected at 46 with a backwardly-directed arm 47, which is provided with a downwardly-directed extension 48, which is connected in the usual manner with the steering-head of the forward fork 10, and by means of this connection of the handle-bar 44 the said handle-bar may be moved laterally with greater convenience and without releasing either end thereof, said handle-bar being capable of turning on its pivotal connection at 46, and in this operation the arm 46 may, as will be understood, be turned from side to side and the forward fork 10 and guide-wheel 11 operated in the usual manner.

In practice the rider is seated on the seat 17 in the usual manner, and his feet are placed on the pedals 42, and the motion of the feet is a forward-and-backward motion, and in this operation the shaft 22 will be revolved, as will be readily understood, and the shafts 25, 26, and 27 will be revolved by the intermediate gearing.

The shaft 27 is provided with a small sprocket-wheel 49, which is geared in connection with the large sprocket-wheel 16 on the drive-wheel 15 by an ordinary drive-chain 50, and the drive-wheel will be propelled, as will be readily understood, by the shaft 27, and the ratio of the intermediate gearing between the shafts 22 and 27 is such that the shaft 25 will be given three revolutions for each revolution of the shaft 22, the shaft 26 will be given three revolutions for each revolution of the shaft 25, and the shaft 27 will be given three revolutions for each revolution of the shaft 26, or, in other words, the shaft 27 will be given twenty-seven revolutions for each revolution of the shaft 22, and the relative size of the sprocket-wheels 16 and 49 is such that the drive-wheel 15 will be given about five revolutions for each twenty-seven revolutions of the shaft 27, or, in other words, the drive-wheel 15 will be given about five revolutions for each revolution of the crank-shaft 22. This result is true only when the pinion 33 on the sleeve 32 is in connection with the gear-wheel 31 on the shaft 26, and this is the normal position of these parts; but in going uphill, where it is necessary to increase the power, the lever 37 is manipulated so as to throw the gear-wheel 34 on the sleeve 32 into connection with the gear-wheel 35 on the shaft 26, it being understood that the power for propelling the vehicle up an incline is increased by this operation, while the speed of the vehicle is decreased.

It will be apparent that the intermediate gearing between the shafts 22 and 27 or the relative proportions thereof may be varied without departing from the spirit of my invention, and it will also be apparent that other changes in and modifications of the various parts of the construction herein shown and described may be made, and I reserve the right to make all such alterations therein as fairly come within the scope of the invention.

One of the chief features of my invention consists in the fact that in operating the pedals, as hereinbefore described, the feet are placed squarely thereon and the pedals pressed against the center of the foot, and the foot is prevented from slipping off of the pedals by the heel of the shoe, and the strain or exertion usually thrown upon the ball of the foot is avoided. I also by reason of the location of the seat 17 and the handle-bar 44 avoid the necessity of throwing the upper portion of the body onto the handle-bar, and thus remove the usual strain upon the arms and hands, and by reason of placing the seat low, as hereinbefore described, the feet may be placed upon the ground when removed from the pedals, and there is therefore no danger of a fall, and by removing the feet from the pedals and placing them upon the ground the bicycle may be held in an upright position whenever desired.

The improved construction and arrangement as comprised in my invention insures compactness and strength, as well as convenience and general effectiveness in the purposes for which the bicycle is designed. In this connection it will be noted that the main portion of the frame consists only of the longitudinal side bars, with a plurality of said bars arranged in parallel position in a vertical plane at each side of said main portion of the frame, in connection with the supplementary arched side bars, which project upwardly from said longitudinal and vertically-parallel sets of bars at each side and at the rear end and constitute a yoke forming a truss at the rear end of said longitudinal and vertically-parallel side bars. The front portion of the frame, formed of the side bars projecting upwardly and forwardly from the front ends of said longitudinal and vertically-parallel side bars of the main portion of the frame and converging to the steering-head, provides, in connection with said main portion, a storage-space, which is of especial utility when the bicycle is employed for military purposes. The mounting of the drive-wheel between the longitudinal and vertically-parallel sets of side bars at the rear end of the frame and within and between the supplementary arched side bars or yokes insures compactness and strength, and the arrangement of the driving mechanism between said longitudinal and vertically-parallel side bars and within the main portion of the frame is also an important feature in this connection. The supplementary arched side bars or yokes at each side the rear portion of the frame, which provides a longitudinal top portion and upright end portions, also provides for the mounting of the seat transversely across and between and upon the longitudinal top portions of said bars or yokes in front of the drive-wheel and the lateral extension of the steering-head, so that it projects with relation to the seat mounted as above set forth and carries the handle-bar, produces a convenient relationship between the steering mechanism and the seat, and also forms a frame upon which an ordnance field-piece or rifle may be mounted for military uses.

In its adaptability for military uses my improved bicycle is especially advantageous, inasmuch as the general construction and arrangement enables the dropping of the feet upon the ground and the supporting of the bicycle in this manner, leaving the hands free for the manipulation of a rifle or other arm. My invention also provides in its general structure an improved bicycle adapted for general purposes and affording a maximum degree of safety.

Having fully described my invention, I claim as new and desire to secure by Letters Patent—

1. An improved bicycle adapted for military and similar purposes, comprising a frame embodying a main portion formed of longitudinal side bars extending from front to rear of the machine, a plurality of said longitudinal side bars being arranged in parallel position in a vertical plane at each side of said main portion of the frame, and a front portion formed of side bars relatively arranged at each side and projecting upwardly from the side bars at the front of the main portion of the frame, whereby a storage-space is provided within the front portion of the frame and the front of the main portion of the frame, a drive-wheel being mounted between said longitudinal side bars of the main portion of the frame at the rear end and the steering head and wheel being connected to said upwardly-projecting front portion of the frame, substantially as and for the purpose set forth.

2. An improved safety-bicycle, comprising a frame embodying a main portion formed of longitudinal side bars extending from front to rear of the machine, a plurality of said longitudinal side bars being arranged in parallel position in a vertical plane at each side of the main portion of the frame, and a front portion formed of side bars extending upwardly and forwardly from said longitudinal side bars of the main portion of the frame at the front, the drive-wheel being arranged between said side bars of the main portion of the frame at the rear end, and the steering-head and wheel being arranged in connection with the upwardly-projecting front portion of the frame, and the driving mechanism inclosed between and carried by the vertically-parallel longitudinal side bars at each side of the main portion of the frame and connected with the main drive-wheel, substantially as and for the purpose set forth.

3. An improved bicycle, comprising the frame embodying a main portion formed of longitudinal side bars extending from front to rear of the machine, a plurality of said longitudinal side bars being arranged in parallel position in a vertical plane at each side of the main portion of the frame, and a front portion formed of side bars extending upwardly and forwardly from the side bars of the main portion of the frame at the front end, and supplementary arched side bars extending upwardly from said longitudinal side bars of the main portion of the frame at the rear end and constituting a yoke forming a truss for the rear end of the longitudinal side bars of the main portion of the frame, the drive-wheel being mounted between the sides of the main portion of the frame formed by said parallel longitudinal side bars and between the supplementary arched side bars or yoke and the steering head and wheel being arranged in connection with the upwardly-projecting side bars of the front portion of the frame, substantially as and for the purpose set forth.

4. An improved bicycle, comprising a frame embodying a main portion formed of longitudinal side bars extending from front to rear of the machine, a plurality of said longitudinal side bars being arranged in parallel position in a vertical plane at each side the main portion of the frame and a front frame portion extending upwardly and forwardly from the top of said longitudinal side bars of the main portion of the frame, supplementary arched side bars projecting upwardly from the top of the longitudinal side bars at the rear and constituting a yoke forming a truss at the rear of the main portion of the frame, the drive-wheel mounted between the longitudinal side bars at the rear and within the supplementary arched side bars or yokes, a seat mounted upon the front portion of the supplementary arched side bars or yoke in front of the drive-wheel, a driving mechanism mounted between the longitudinal and vertically-parallel sets of side bars at the rear end of the main portion of the frame, said driving mechanism being connected with the drive-wheel and embodying gears and a crank-shaft for operating the same, rods pivotally suspended from the upwardly and forwardly projecting front portion of the frame, pitmen extending from the lower ends of said rods to the cranks upon the crank-shaft of the driving mechanism, and pedals or foot-pieces mounted at the joint between said pivoted rods and the pitmen, the relative construction and arrangement being such that a low seat is provided and a direct forward thrust upon the pedals or foot-pieces is enabled, substantially as and for the purpose set forth.

5. As an improvement in bicycles, the combination, with the frame embodying the main portion formed of longitudinal side bars extending between the drive-wheel and the steering-wheel, a plurality of said longitudinal side bars being arranged in parallel position in a vertical plane at each side the main portion of the frame, and the drive-wheel mounted between said longitudinal and vertically-parallel sets of side bars at the rear end and having a large sprocket wheel or gear upon its shaft, of the pedal-shaft mounted upon said longitudinal side bars of the main portion of the frame in front of the drive-wheel and carrying a gear and having its ends projecting beyond said side bars, a gear mechanism mounted and sustained upon said longitudinal side bars and within the main portion of the frame formed thereby and consisting of a supplementary shaft having a relatively small sprocket or gear connected with the sprocket or gear upon the shaft of the drive-wheel and provided with a gear and a series of shafts intermediately arranged between the pedal-shaft and said supplementary shaft and provided with relatively intermeshing pinions and gears, whereby the driving mechanism is mounted within the main portion of the frame formed by said longitudinal and vertically-parallel sets of side bars and the speed of the pedal-shaft is communicated to and multiplied in the supplementary shaft and the speed of the supplementary shaft is communicated to and reduced in the drive-wheel shaft and a strong leverage is obtained in the communication between the supplementary shaft and the drive-wheel shaft, substantially as and for the purpose set forth.

6. In a bicycle, an improved frame comprising a main portion formed of longitudinal side bars extending from end to end at the bottom portion of the machine, a plurality of said longitudinal side bars being arranged in parallel position in a vertical plane at each side said main portion of the frame, the front portion formed of relatively-arranged side bars projecting upwardly and forwardly from said longitudinal side bars of the main portion of the frame at the front end and converging at their top ends to the steering-head, and a supplementary frame portion formed of the arched side bars projecting upwardly from said longitudinal and vertically-parallel sets of side bars at each side of the main portion of the frame at the rear end and constituting a yoke which forms a trussed rear end, the drive-wheel being received between said longitudinal and vertically-parallel sets of side bars and within the supplementary arched side bars or yokes and the steering-head and wheel being arranged in connection with the convergent front end of the forwardly and upwardly projecting front portion of the frame, substantially as and for the purpose set forth.

7. An improved safety-bicycle, comprising the frame embodying a main portion formed of longitudinal side bars extending from end to end, a plurality of said longitudinal side bars being arranged in parallel position in a vertical plane at each side of said main portion of the frame, and a front portion extending upwardly and forwardly from said longitudinal side bars at the front ends, supplementary arched side bars projecting upwardly from the longitudinal and vertically-parallel side bars of the main portion of the frame at each side the latter at the rear end and constituting a yoke which forms a truss at the rear end of said longitudinal side bars, the drive-wheel mounted between the longitudinal and vertically-parallel sets of side bars at the rear end of the main portion of the frame, driving mechanism supported by and mounted between said longitudinal side bars and within the main portion of the frame formed thereby, said driving mechanism being connected with the drive-wheel, the steering-wheel and steering-head arranged in connection with the upwardly and forwardly projecting front portion of the frame, the steering-head being extended laterally and carrying the handle-bar upon said extension, and the seat supported upon the supplementary side bars or yokes, substantially as and for the purpose set forth.

In testimony that I claim the foregoing as my invention I have signed my name, in presence of the subscribing witnesses, this 8th day of October, 1897.

GEORGE W. MANSON.

Witnesses:
C. GERST,
A. C. VAN BLARCOM.